United States Patent [19]

LeBlanc

[11] Patent Number: 5,321,938
[45] Date of Patent: Jun. 21, 1994

[54] ALL TERRAIN MOWER

[76] Inventor: Wendell L. LeBlanc, 1900 Wheeler Co. Rd., #17, Shamrock, Tex. 79079

[21] Appl. No.: 16,245

[22] Filed: Feb. 11, 1993

[51] Int. Cl.⁵ .................... A01D 34/66; A01D 34/76; A01D 34/86
[52] U.S. Cl. .......................... 56/6; 56/14.7; 56/235; 56/DIG. 22
[58] Field of Search .................. 56/6, 13.5, 13.6, 14.7, 56/15.8, 228, 234, 235, DIG. 22, DIG. 10

[56] References Cited

U.S. PATENT DOCUMENTS

| | | | |
|---|---|---|---|
| 3,839,919 | 10/1974 | Mollen et al. | 476/30 |
| 4,538,400 | 9/1985 | Hottes | 56/13.6 X |
| 4,869,054 | 9/1989 | Hostetler et al. | 56/6 |
| 4,977,732 | 12/1990 | Minter | 56/11.4 |
| 5,127,214 | 7/1992 | Colistro | 56/6 |
| 5,161,353 | 11/1992 | Bergkamp et al. | 56/6 |

*Primary Examiner*—David J. Bagnell
*Attorney, Agent, or Firm*—John D. Jeter

[57] ABSTRACT

A mowing machine with a self propelled carriage for riding with steering front and powered rear wheels with a mowing cutter structure with three mower decks transversely distributed and suspended from the carriage between front and rear wheels, each deck with a vertical spindle carrying a cutter blade. The center deck is suspended from the carriage for vertical lift and adjustment with an outboard deck supported by hinges on each of its sides for up and down pivoting to follow ground contour, for individual power tilting for brush trimming, clearing of obstacles, and to narrow the plan form for transport. A transverse rear axle has a differential with a forwardly extending housing carrying, in series, a carriage drive speed change transmission, a carriage drive clutch, an input drive gear driven from an overhead engine, a mower control clutch, and a triple power head with three gear connected projecting power take-off shafts. The three mower spindles are each carried by a right angle gear head connected by flexible, telescoping, drive shafts, each connected to one of the power take-off shafts.

20 Claims, 3 Drawing Sheets

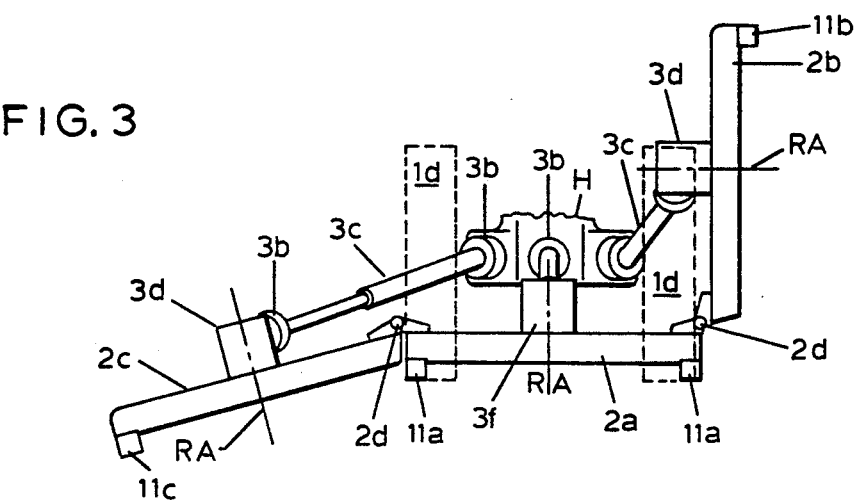
FIG. 3
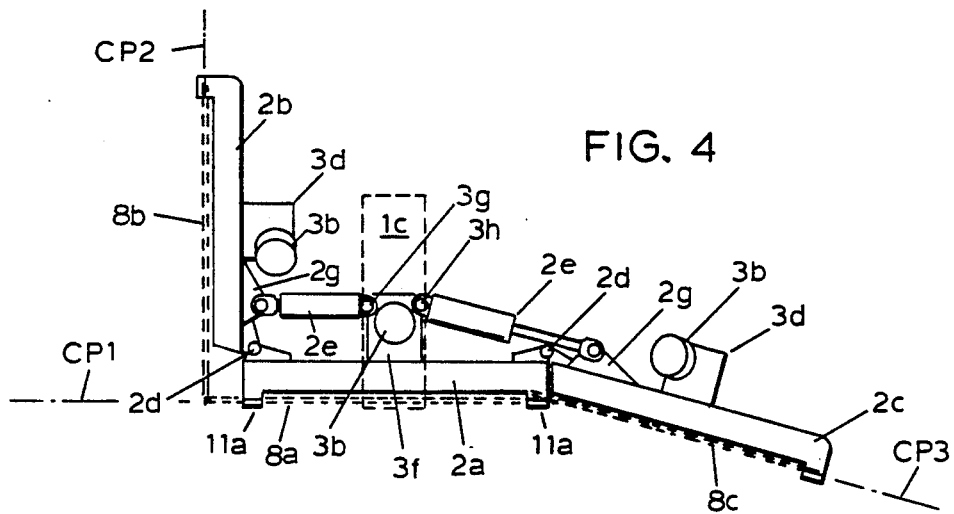
FIG. 4
FIG. 5
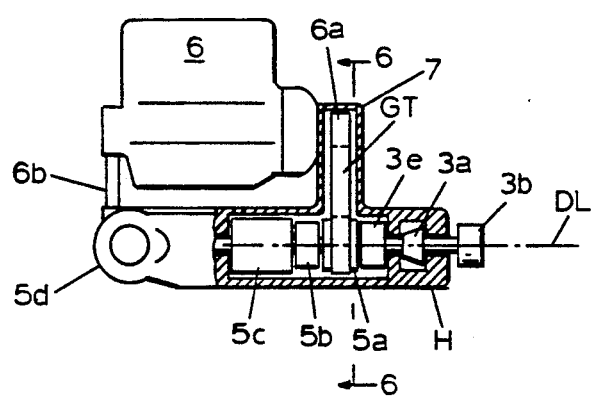
FIG. 6
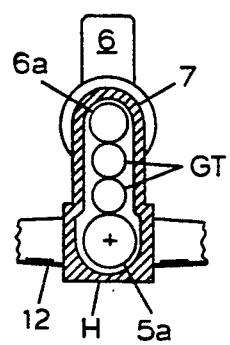

ALL TERRAIN MOWER

This invention pertains to mowing machines of the self-propelled type. More specifically, it pertains to mowers with cutting blades carried by a plurality of vertical drive spindles distributed between fore and aft vehicular wheels.

BACKGROUND OF THE INVENTION

Self propelled, engine driven, riding mowers have been in use for several decades. In the last twenty years evolution has stabilized to provide the domestic lawn mower, mowers with the cutters forward of carriage wheels, cutters trailing carriage wheels, and specialized mowers such as those on booms extending from wheeled carriages. Domestic lawn mowers are ideally suited to small tracts having gradual grade changes but they cannot negotiate rough terrain to gain access to areas suitable for their operation. Mowers with the cutters ahead of the carriage wheels have no peers for maneuverability and work well around trees in parkways and the like. They do require constant operator attention to terrain changes. They do not negotiate rough terrain very well, especially with cutters suspended rather than riding on limiter skids that prevent scalping turf, Mowers with the cutters trailing the carriage are awkward for the operator to observe and they will negotiate rough terrain for access to operational areas, they endanger operators and observers that the operator cannot constantly monitor, Additionally, they have evolved around the common agricultural tractor which is commonly quite heavy compared with a carriage required to manage the mowing machinery. Further, the massiveness of the tractor requires a robust cutter frame to withstand the inevitable impact involving the tractor inertia, Specialized mowers serve a purpose in mowing areas no carriage can access and, if there, could not operate because of congestion and severe grade change. They are small area necessities.

The mower construction art has evolved to usually define mower structure with at least one vertical spindle carrying a cutter blade in a rigid housing as a mower deck, therefore, that definition will be used herein and the mower assembly hingedly connecting three rigid, blade carrying, cutter decks will be regarded as an assembly of three independent decks. The upper plane of a deck is generally above and parallel to the mowed plane.

There is a need for a mowing machine that will negotiate terrain too rough for mowing operation yet work efficiently on large areas once accessed. For overall economic reasons the, entire machine needs a balanced concept providing self-propelled transport with cutter and carriage ruggedized only to the extent the purpose requires. Additionally, the drive system for all powered components needs simplification rather than adaptation of existing systems not ideally suiting the purpose.

It is therefore an object of this invention to provide a mowing machine with a carriage suitable for on-road and off-road self transport, with a high lift cutter system that will fold to legal width for road transport.

It is another object of this invention to provide a mowing machine with a simplified drive system for both mowing machinery and the carriage, with easy maintainability, that is usable on reasonably rough terrain.

It is still a further object of this invention to provide hinged assembly of mower decks to permit a wide cutting swath to generally follow rolling terrain.

It is yet another object of this invention to provide a mowing machine with a hinged assembly of mower decks that will tilt at the hinges while keeping the cutter blades above the cutting plane of a selected deck.

It is still another object of this invention to provide mower cutting blades with the tips upturned with a radius that originates at the center of rotation of hinges that control the tilting movement of the tilted deck structure.

These and other objects, advantages, and features of this invention will be apparent to those skilled in the art from consideration of this specification, including the attached claims and appended drawings

SUMMARY OF THE INVENTION

The mowing machine has a wheeled carriage with mowing cutter structure suspended between fore and aft wheels. The cutter framework has three sections, or mower decks, distributed laterally of the carriage with outboard decks hinge supported on outboard fittings of the central deck. Cutting blades rotate on vertical drive spindles in the usual operational state but either or both outboard decks can tilt upward or downward on the hinges to follow terrain and can be tilted upward by operator controlled power tilt to conform to uneven terrain, narrow the overall width for transport, to clear local objects, and to cut a vertical plane along hedge borders. Anti-scalping skids or rollers, or a combination of both, may be optionally used to establish a minimum cutting height.

All three cutting blades are powered by independent, telescoping, propeller shafts with universal jointed or flexing element terminals which are interconnected by a triple output power head at the front of a transmission housing which is integral with or is attached to the differential housing and rear axle. Carriage propulsion and cutter rotation is powered by a single engine which is gear connected to the transmission input drive gear between the differential and the triple output power head. The drive line includes independent manually operated clutches for the mower and carriage. The carriage transmission permits selection of the amount of ground related movement per turn of mower blades.

The three cutter blades are readily synchronized by the generally central gear drive so that overlapping blade swing radii is permissible without blade interference. The cutter drive clutch is an adjustable torque transmitting device capable of limiting force on blades that encounter obstructions so that synchronization is retained during forced clutch slippage. The cutter drive system will drive the cutters when outer mower decks are tilted upward, either by terrain or by deliberate lifting of outer decks. Mowing can continue with either or both outboard decks lifted. When outboard decks are tilted to or near vertical they can edge hedge or brush. The outer decks are, optionally, hinged to the central deck about vertically movable longitudinal lines such that when the outboard decks are tilted the blade tips reach the cutting plane of the center deck blade. The blade rotating about a horizontal spindle, with an outboard deck vertical, does not reach the ground plane yet leaves no uncut plant streak. Optionally, the cutter blades are provided with an upturned radius at the ends, with the origin at the hinge line, to blend vertical and horizontal planes being cut.

Independent hydraulic cylinders, mounted on the central deck, tilt the outboard decks upward under control of the operator. A separate hydraulic cylinder, operating through linkage to the carriage, lifts all decks relative to the ground plane for transport or cut height adjustment.

BRIEF DESCRIPTION OF DRAWINGS

In the drawings wherein like features have the same captions,

FIG. 3 is a partial front view without the carriage, emphasizing mower decks and their drive system.

FIG. 4 is a rear view of the mower deck assembly, showing the tilt mechanism for the deck assembly.

FIG. 5 is a side view, partly cut away, of the power train.

FIG. 6 is a sectional view taken along line 6—6 of FIG. 5.

DETAILED DESCRIPTION OF DRAWINGS

Figure 1:
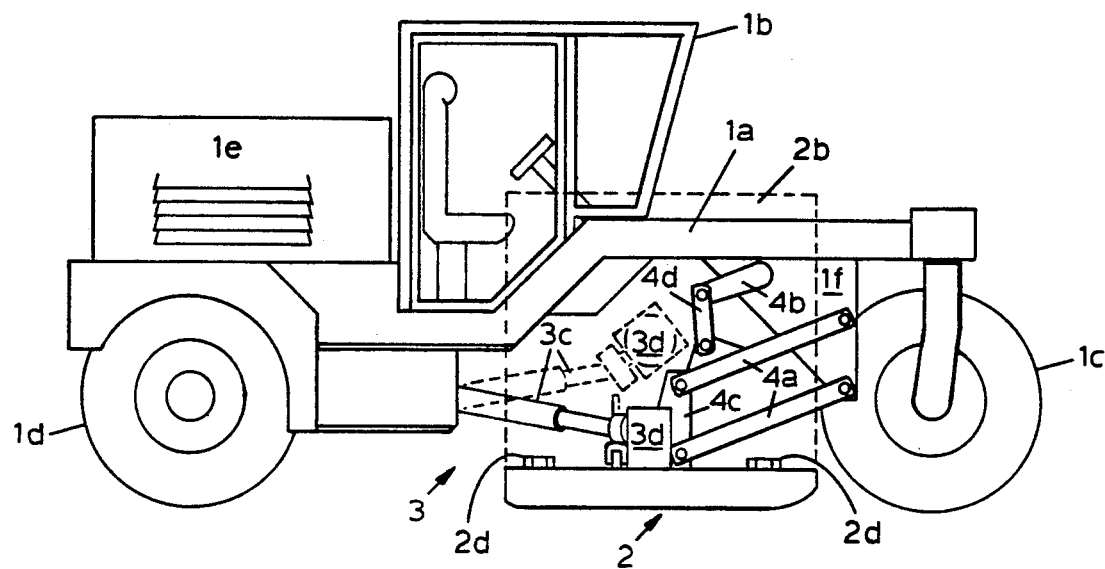
FIG. 1 is a side elevation of the overall machine.

In the drawings many features pertaining to manufacturing and maintenance utility well established in the machine construction art, but not bearing upon points of novelty, are omitted in the interest of clarity and descriptive efficiency. Such features may include weld lines, threaded fasteners, hinge pins, casting interface connections, and the like.

In FIG. 1 the overall machine is shown as normally used. The motorized carriage 1 has an engine in housing 1e driving rear wheels 1d, directionally controlled by front wheel 1c, with an operator cab 1b on arched chassis frame 1a. The mower deck assembly 2 is suspended by links 4a from frame bracket under vertical control of lift bell crank 4b and links 4d, connected to the mower deck by bracket 4c. Power is supplied to the mower blades (not shown) by power train 3. Power train 3, described in more detail later herein comprises telescoping drive shafts 3c extending to mower drive right angle gear boxes 3d and 3f.

Figure 2:
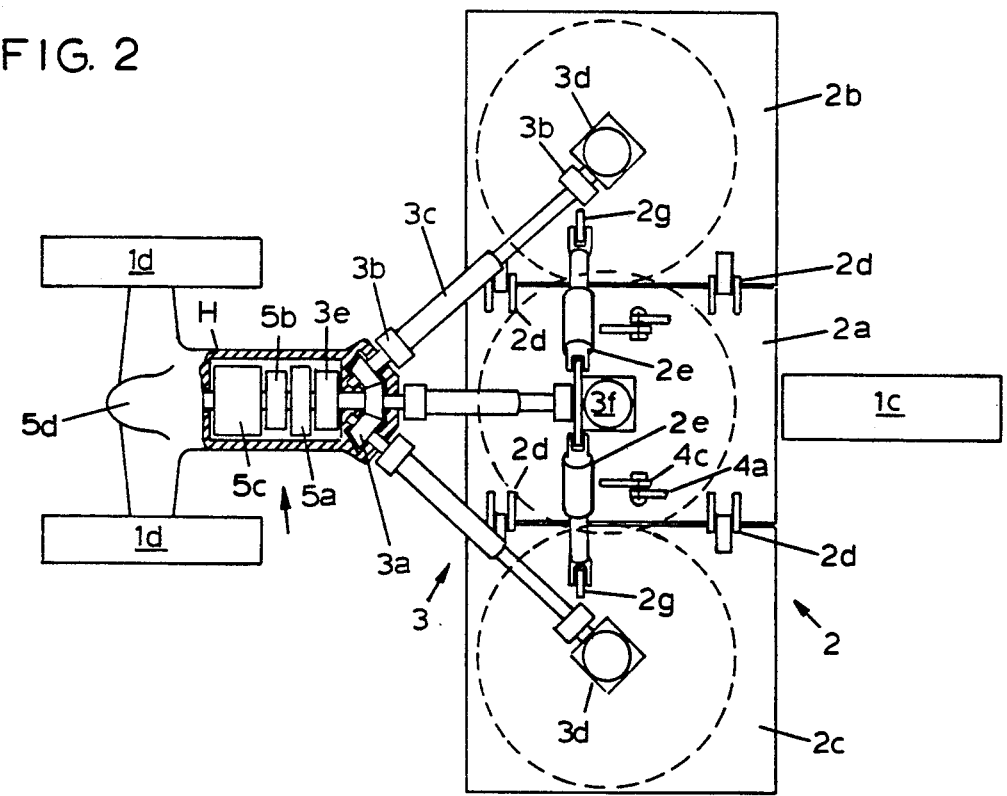
FIG. 2 is a plan form elevation with most of the carriage omitted and some area cut away.

FIG. 2, devoid of chassis frame, more clearly shows the layout of the mower deck assembly. There are three mower decks, the central deck structure is the controlling main frame to which both left and right decks are hingedly attached by hinges 2d which allow the outboard decks to tilt about a horizontal line. Hydraulic lift cylinders 2e are pivotally attached, for structural convenience, to an extended bearing flange on the tower of the central gear box 3f and extend to lift eyes 2g welded to the outboard decks. The lift cylinders can be individually controlled from the cab and can cause either outboard deck structure to lift vertically about hinges 2d up to the vertical position shown by dotted lines in FIG. 1. The individual decks have anti-scalping features, shown here as skids, to limit the minimum ground clearance of the cutter blades. The outboard decks can drop down about fifteen degrees to follow ground contour. Cutting can continue under power as the outboard decks tilt up or down as urged by the outboard skids and even when power lifted about the hinges.

The dotted circles are the cutting blade tip arcs and are seen to overlap. The all-gear drive system permits synchronization of the cutter blades to avoid interference at the overlap. Right angle gear boxes can be purchased such that the spindles can rotate in the preferred direction with either direction of rotation of the input shaft. Some gear boxes permit the direction to be shop changed by switching the driven spindle gear with teeth up or teeth down relative to the blades. This permits adaptation of blade rotation to suit the nature of the material to be mowed and the choice of mulching or cutting discharge direction. In the large coarse cutting application a plurality of cutter elements are usually attached to a spinning disc. The smaller grass cutting version functions well with straight bar cutter blades without pivotable ends. The large multi-cutter blades have to be synchronized with the interfering tips of the blades moving in the same direction. Otherwise stated the outboard blades have to rotate in a direction opposite that of the central cutter blade. With the straight blades, synchronization can be in either rotational direction without causing interference. On frequently cut terrain, with cuttings to be mulched rather than discharged the usual preference is for both outboard blade tips to move forward at the outer perimeter to foster regrinding. The drive system disclosed permits this freedom of choice.

The simplified drive system utilizes a single input to the transmission from the engine by way of input 5a. This is a cog belt drive on small units and a gear drive, by gear train (no shown), on larger units, from the engine output to the transmission. Clutch 3e controls, and limits, torque delivery from the engine. Clutch 5b controls torque delivery to the drive wheels 1d by way of differential 5d in unitary gear box H. Clutch 3e eliminates the need for shear pins in the individual cutter drives which would sacrifice synchronization, Drive wheels 1d are, preferably, reversible dished wheels that permit widening the stance of the rear wheels if the machine is not to be used as a brush edger. Such wheeled arrangements are well known in the art of carriage construction.

FIG. 3 is a front view showing the mower deck assembly, power head, and mower drive system without the carriage elements, deck suspension system, and deck power tilt system. The rear wheels are shown in dashed lines for perspective. The spindle rotational axes RA are shown. The left deck 2b is shown tilted to the vertical position, usually done by power lift, and the right deck 2c is shown tilted down, usually a result of terrain following, commonly influenced by skids 11c. The telescoping drive shafts 3c have flexing elements 3b. Except for possible length differences all shafts 3c are identical.

FIG. 4 is a rear view of the deck assembly of FIG. 3 omitting the drive shafts to illustrate the power tilt system. Right angle gear heads 3d and 3f would be identical but the input bearing flange of gear head 3f is adapted, for convenience, to provide attach points 3g and 3h for the tilt cylinders 2e. A separate structure attached to deck 2a could serve this purpose. Lift eyes 2g on the outboard decks serve as attach points for the tilt cylinders. Outboard cutting blades are shown 8b and 8c, with the center blade 8a shown somewhat above skids 11a which limit minimum blade height above ground. The center cutting plane CP1 and the cutting plane CP3 for deck 2c is the common terrain following situation permitted by open center valving for power controls for the tilt cylinders. These valves are not shown and are common to machine construction art. Deck 2b has been power tilted to the vertical position. In that position the cutting plane CP2 of the blade may be used to trim brush or hedge. The blade tips of deck 2b reach the cutting plane CP1 if the hinges 2d pivot is the same distance above the plane CP1 as the amount of extension of the blade arc beyond a vertical plane containing hinge line 2d.

FIG. 5 shows the relationship of engine 6 to drive line DL. Motor mount 6b supports one end of the engine which is fastened to the transmission by way of tower 7 which is part of, or attached to, the transmission housing H. The engine output gear 6a is connected to input gear 5a by way of gear train GT. The primary gear 3a and attached flex unit 3b are on the drive line. Secondary gears, not visible in this figure, are shown in FIG. 3 to be in a horizontal plane. This is not to be considered in a limiting sense, the secondary gears may be above or below the horizontal plane of line DL without departing from the construction principle.

FIG. 6 shows the gear train GT to be composed of idler gears but can include speed changing gearing common to the machine construction art. Additionally, gears 6a and 5a can be connected by a cog belt drive system readily definable as geared connection. This front view shows axle housing 12 common to large units, which may be only a bare axle on smaller units,.

Figure 7:
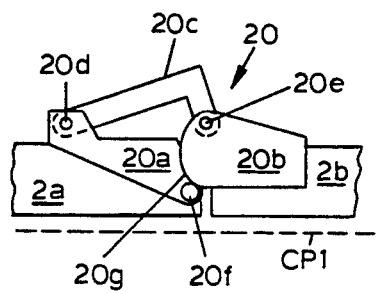
FIG. 7 is a frontal view of a selected portion, somewhat enlarged, of an alternate hinge system for control of one outboard deck.
Figure 8:
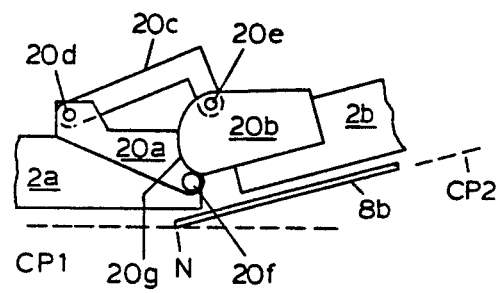
FIG. 8 is the same view as FIG. 7 with one deck tilted upward in terrain following configuration.
Figure 9:
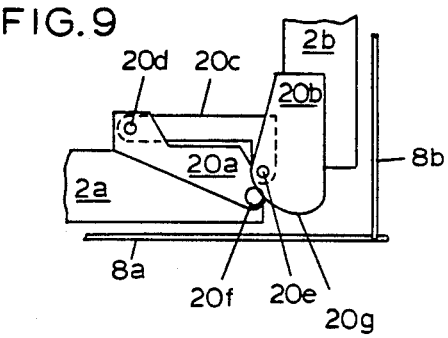
FIG. 9 is the same view as FIG. 7 with an outboard deck tilted to the vertical position.

FIGS. 7, 8 and 9 show a portion of the same machine previously described herein with an alternate form hinge system between the center deck and at least one of the outboard decks. If the cutter blades overlap in the lateral dimension and the outboard blade extends inboard of the hinge line the tip will reach below the center deck cutting plane when the outboard deck tilts upward. If the outboard blade reaches just to the hinge line it will not cut below the center deck cutting plane when tilted upward but will begin to leave a gap when the tilt continues upward if the hinge line is above the cutting planes. The present hinge system compensates for the hinge and blade geometry problem and allows the inboard tip of the outboard blade to follow the inboard cutting plane throughout the upward tilt range of the outboard deck.

Figure 10:
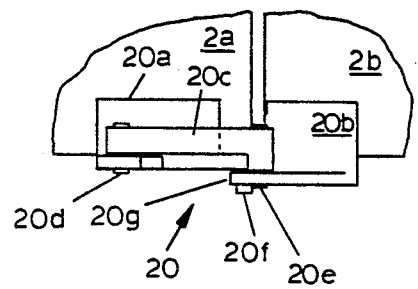
FIG. 10 is a top view of the hinge assembly shown in FIGS. 7, 8, and 9.

Hinge base 20a is attached to the same center deck 2a and carries cam follower pin, or roller, 20f. Hinge base 20b attached to the same outboard deck 2b and carries cam surface 20g which bears on pin 20f. Hinge pins 20d and 20e are connected by link 20c which allows deck 2b to move vertically at pin 20e. Small terrain following tilt angles require the pin 20e to lift to allow the tip of blade 8b to stay on the cutting plane CP1 of the center deck at point N. At larger tilt angles, when the tip of blade 8b is outboard of pin 20e the pin 20e is lowered by the cam to allow the tip to stay on plane CP1. In the hedge trimming position of FIG. 9 it may be desirable to have blade 8a reach beyond the cutting plane of CP2 of blade 8b and that arrangement is shown. FIG. 10 shows the hinge structures to extend outside the profile of the deck structures to simplify the construction of the overall assembly.

Figure 11:
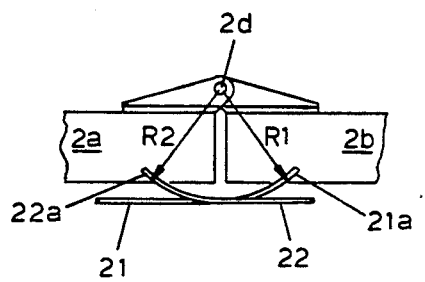
FIG. 11 is a frontal view of the same area a shown FIG. 7 with the hinge system of FIGS. 1-4 with a special cutter blade arrangement.
Figure 12:
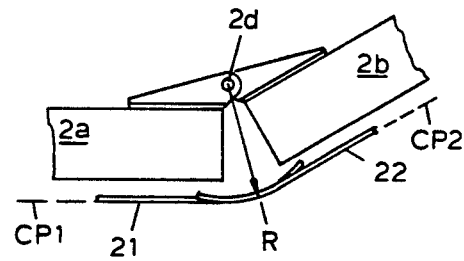
FIG. 12 is the same view as FIG. 11 with an outboard deck tilted in the usual terrain following configuration.

FIGS. 11 and 12 show the general construction as FIGS. 1 through 4 and only the blades are changed. Both inboard and outboard blades 21 and 22 have end radii R1 and R2, respectively, with origins at the centerline of the pin of hinge 2d. The radii extend through an arc at least half the expected maximum tilt angle of the outboard deck. When the outboard deck is tilted upward cutting planes CP1 and CP2, made by the blades, will be joined by radius R.

The three mower decks are shown to have the same blade diameter. This is not to be construed in a limiting sense. In some applications it is advantageous to use the center blade of larger diameter than the outboard blades. The center blade and related structure can be more massive in the configuration often referred to as a brush hog and to serve that function with outboard decks of lighter construction lifted to the vertical position to reduce damage when coarse cutting is encountered.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the tool of this invention without departing from the scope thereof, it is to be understood that all matter herein set forth or shown the accompanying drawings is to be interpreted as illustrative and not in a limiting sense.

The invention having been described, I claim:

1. An improved self propelled, riding, mowing machine having a carriage with fore and aft wheels with a mower deck assembly situated therebetween, distributed transversely of the carriage, with foldable outer decks connected by hinge means with a longitudinal pivot line to a supporting center deck suspended from the carriage for vertical lift and vertical adjustment by linkages connected to the carriage, each deck having a generally central vertical spindle for rotating a cutter blade below each deck, said hinged connection allowing said outer decks to rotate for tilting relative to the center deck, about said pivot line, from somewhat below the horizontal plane of the center deck up to a generally vertical position in which said outer deck spindles are generally horizontal with their blades outward relative to the carriage, the improvement comprising:

a transverse rear driving axle with a generally central differential and a connected power distribution transmission housing extending forwardly therefrom with a longitudinal drive line therein, an engine mounted above and parallel with said drive line with an engine output shaft gearingly connected to a transmission input gear rotating about said drive line, said differential powered by a speed change transmission and a manual engage and disengage clutch distributed along said drive line forwardly to said input gear, a mower drive manual engage and disengage clutch, a primary mower drive gear and mower output drive shaft distributed along said line forward from said input gear, a secondary mower drive shaft situated on each side of said primary mower output drive shaft each with secondary gear arranged to engage said drive gear, for sympathetic rotation of said three output shafts, said primary mower output shaft rotationally connected by a telescoping flexible drive shaft to the input shaft of a right angle gear head carrying said spindle of said center deck, each said secondary mower drive output shaft rotationally connected by a telescoping flexible drive shaft to the input shaft of a right angle gear head carrying said spindle of the nearest outboard mower deck, and manually controllable power tilt means, attached to said center mower deck, arranged to rotate each outboard mower deck independently about said pivot line, and actuator means for said two clutches and said power tilt means extending to a position accessible to an operator of the mowing machine.

2. The mowing machine of claim 1 wherein said engine output shaft carries an output gear rotationally connected to said input gear by at least one idler gear.

3. The mowing machine of claim 1 wherein said engine output gear is rotationally connected to said input gear by a speed changing gear train.

4. The mowing machine of claim 1 wherein said input gear is rotationally connected to said engine output gear by a geared connection defined as a cog belt.

5. The mowing machine of claim 1 wherein said mower drive clutch is a limited torque transmitting clutch.

6. The mowing machine of claim 1 wherein said hinge means comprises a cam and cam follower arrangement, responsive to the amount of tilt of at least one said outer deck to move the related said pivot line vertically relative to said center deck to keep the lower side of the arc made the ends of said outer deck blade, when rotating on said spindle, generally coincident with the cutting plane of said center deck blade.

7. The mowing machine of claim 1 wherein said cutter blades have upwardly curved ends, each end with a radius originating generally at said pivot line when said blade is positioned perpendicular to a vertical plane containing said pivot line.

8. The mowing machine of claim 1 wherein said primary mower drive gear and said secondary mower drive gears are miter gears and said mower output shafts extend from said housing separated by divergent axes of rotation.

9. An improved self propelled, riding, mowing machine having a carriage with fore and aft wheels with a mower deck assembly, with three vertical cutter blade carrying spindles transversely distributed, situated therebetween and suspended from the carriage for vertical lift and vertical adjustment by linkages connected to the carriage, the improvement comprising:
a) said assembly comprising three independent mower decks, a center deck and an outer deck on each lateral side thereof with height control means to suspend said center deck from said carriage with manually controlled power lift means, responsive to operator control;
b) hinge means with a longitudinal pivot line arranged connect adjacent decks, for pivoting about said pivot line;
c) power tilt means, responsive to operator control, attached to said center deck and extending to each said outer deck to tilt said outer decks relative to said center deck;
d) differential and transverse axle arrangement to drive separated rear wheels with a transmission housing with generally central drive line extending forwardly therefrom and containing a speed change transmission and manual control carriage clutch extending forward along said drive line and rotationally connected to an input gear;
e) a manual control mower drive clutch rotationally connected to said input gear arranged to extend forward along said drive line and to rotate a primary mower drive shaft that carries a transfer gear thereon;
f) two secondary mower drive shafts, one on each side of said primary mower drive shaft, each carrying a secondary gear arranged to mesh with said transfer gear so that all three mower drive shafts rotate in sympathy and extend forward from said housing;
g) linkage means to make controls for said tilt means, said transmission, said carriage clutch, and said mower clutch accessible to an operator on said carriage;
h) three right angle gear heads, one mounted on each said deck with an output shaft functioning as said spindle and an input shaft extending generally toward said housing;
i) three flexible telescoping transfer shafts, one rotationally mounted on each said mower drive shafts and extending to and rotationally secured to said input shaft on one of said gear heads;
j) an engine mounted on said housing above said drive line with an output gear arranged to drive said input gear.

10. The mowing machine of claim 9 wherein said engine output gear is rotationally connected to said input gear by at least one idler gear.

11. The mowing machine of claim 9 wherein said engine output gear is connected to said input gear by a speed changing gear train.

12. The mowing machine of claim 9 wherein said input gear is rotationally connected to said engine output gear by a geared connection defined as a cog belt.

13. The mowing machine of claim 9 wherein said mower drive clutch is a limited torque transmitting clutch.

14. The mowing machine of claim 9 wherein said hinge means comprises a cam and cam follower arrangement, responsive to the amount of tilt of at least one said outer deck to move the related said pivot line vertically relative to said center deck to keep the lower side of the are made by the ends of said outer deck blade, when rotating on said spindle, generally coincident with the cutting plane of said center deck blade.

15. The mowing machine of claim 9 wherein said cutter blades have upwardly curved ends, each end with a radius originating generally at said pivot line when said blade is perpendicular to a vertical plane containing said pivot line.

16. The mowing machine of claim 9 wherein said transfer gear and said secondary gears are miter gears and said mower drive shafts extend from said housing separated by divergent axes of rotation.

17. A mowing machine with at least two adjacent mower decks, each with a vertical spindle carrying a cutter blade, connected by hinge means with a pivot line generally parallel to a line defined as the usual mowing direction, comprising: a curve in the cutting edge of the blade extending from the end of the blade some distance toward said spindle with a radius such that the center of radius generally coincides with said pivot line when said blade extends perpendicular to a vertical plane containing said pivot line, whereby the intersection of cutting planes of said adjacent decks is blended by a radius when one deck is tilted upward about said pivot line relative to the other deck.

18. A mowing machine with at least two adjacent mower decks, each with a vertical spindle carrying a cutter blade to produce a cutting plane when rotating about the axis of said spindle, connected by hinge means with a pivot line generally parallel to a line defining the usual mowing direction, comprising: cam and cam follower means, responsive to the angle between said cutting planes of said two decks, to move said pivot line generally perpendicularly to said plane of a first deck such that the arc defined by the tip of said blade rotating on the other deck will remain generally on the cutting plane of said first deck during changes in angle between said cutting planes.

19. The mowing machine of claim 18 wherein said cam follower is a surface on one deck and said cam is a surface on the other deck.

20. The mowing machine of claim 18 wherein said hinge means comprises a hinge member on one deck and a link attached to the other deck by means allowing some vertical movement of said hinge to allow said movement of said pivot line.

* * * * *